(12) United States Patent
Yoon et al.

(10) Patent No.: US 9,231,640 B2
(45) Date of Patent: Jan. 5, 2016

(54) PROTECTIVE DEVICE FOR MOBILE TERMINAL

(71) Applicant: Samsung Electronics Co., Ltd, Gyeonggi-do (KR)

(72) Inventors: Byounguk Yoon, Gyeonggi-do (KR); Sanghun Kim, Gyeonggi-do (KR); Yongseok Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 174 days.

(21) Appl. No.: 14/026,974

(22) Filed: Sep. 13, 2013

(65) Prior Publication Data

US 2014/0080552 A1    Mar. 20, 2014

(30) Foreign Application Priority Data

Sep. 14, 2012 (KR) .................. 10-2012-0102075

(51) Int. Cl.
*H04B 1/38* (2015.01)
*H04B 1/3888* (2015.01)

(52) U.S. Cl.
CPC .................. *H04B 1/3888* (2013.01)

(58) Field of Classification Search
CPC .................................................. H04B 1/3888
See application file for complete search history.

(56) References Cited

U.S. PATENT DOCUMENTS

| 8,599,547 | B2* | 12/2013 | Richardson et al. | ....... 361/679.3 |
| 8,824,140 | B2* | 9/2014 | Prest et al. | ....... 361/679.56 |
| 2008/0242384 | A1* | 10/2008 | Hsu et al. | ....... 455/575.8 |
| 2008/0316687 | A1* | 12/2008 | Richardson et al. | ....... 361/680 |
| 2011/0261513 | A1 | 10/2011 | Tho | |
| 2012/0071217 | A1* | 3/2012 | Park | ....... 455/575.8 |
| 2012/0320501 | A1* | 12/2012 | Ackloo | ....... 361/679.01 |
| 2013/0088815 | A1* | 4/2013 | Hu et al. | ....... 361/679.01 |
| 2013/0102368 | A1* | 4/2013 | Lee | ....... 455/575.8 |
| 2013/0113348 | A1* | 5/2013 | Holben et al. | ....... 312/223.1 |
| 2013/0153457 | A1* | 6/2013 | Liang | ....... 206/521 |
| 2013/0210504 | A1* | 8/2013 | Mareno | ....... 455/575.8 |
| 2013/0271897 | A1* | 10/2013 | Limber et al. | ....... 361/679.01 |

FOREIGN PATENT DOCUMENTS

| EP | 2381654 A1 | 10/2011 |
| JP | 2000-259084 | 9/2000 |
| KR | 10-2004-0045165 | 6/2004 |

OTHER PUBLICATIONS

Extended European Search Report dated Nov. 28, 2013 in connection with European Patent Application No. 13184195.9, 5 pages.

* cited by examiner

*Primary Examiner* — Lisa Lea Edmonds (57) ABSTRACT

A protective device for a mobile terminal includes a glass window and a glass case housed in the mobile terminal and formed with glass of a three-dimensional curved surface form having a circumferential edge lower than the center, the protective device includes: a first peripheral protection portion housed along a circumferential edge of the glass window and in which a tangent line in which a portion thereof contacts with a surface of the glass window forms an angle of 0° or more with a horizontal line; and a second peripheral protection portion housed along a circumferential edge of the glass case and in which a tangent line in which a portion thereof contacts with a surface of the glass case forms an angle of 0° or more with a horizontal line.

44 Claims, 11 Drawing Sheets

PROTECTIVE DEVICE FOR MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed on Sep. 14, 2012 in the Korean Intellectual Property Office and assigned Serial No. 10-2012-0102075, the entire disclosure of which is hereby incorporated by reference.

TECHNICAL FIELD

The present disclosure relates to a protective device for a mobile terminal, and more particularly, to a protective device for a mobile terminal that protects a glass case and components mounted inside and to the outside of the mobile terminal from an external impact and provides solidity and an enhanced external appearance to the mobile terminal while corresponding to a trend of a small size and a light weight of a mobile terminal.

BACKGROUND

In general, a mobile terminal is an electronic device in which a user can perform wireless communication with another party while carrying the mobile terminal from place to place. Such a mobile terminal that can perform various functions is in a trend of a small size, small thickness, and light weight in consideration of portability and advances in a multimedia direction.

Particularly, a future mobile terminal will be used for a multi-function and a multipurpose while having a small size and a light weight and will be modified to apply to various multimedia environments or an Internet environment.

Further, a mobile terminal can communicate data in a high speed in addition to performing an audio dedicated communicating function. That is, as a consumer's desire increases, the mobile terminal will provide a service using wireless communication technology that can transmit data in a high speed.

General mobile terminals essentially include a data input and output device, a speaker device, microphone device, and antenna device.

A mobile terminal is a recently widely used smart phone and is a mobile communication terminal that is integrated with a mobile phone function that can communicate with a general phone or a mobile communication terminal through a base station while moving and with a computer support function that can install and use an application in which a user wants by accessing to wireless Internet.

In order to effectively use the computer support function, an almost entire front surface of the mobile terminal is formed with liquid crystal, and such liquid crystal should increase strength to protect from damage by an external impact.

That is, in a smart phone, because the liquid crystal for displaying a computer support function is an important element for embodying a function of a smart phone, unlike other mobile phones, it is important to endure an external impact while maintaining a clean state for a long term. Accordingly, the liquid crystal of the smart phone is generally formed in a glass plate.

However, even if liquid crystal of a smart phone is formed in a glass plate, the smart phone does not have a separate device for protecting the inside and the outside of the smart phone.

Therefore, when a strong impact is applied to a front surface of an external appearance of the smart phone, due to a reason such as drop of the smart phone, does not have an external appearance design that can appropriately absorb and distribute the impact and thus a problem that the applied impact is transferred to a cover case, and a display area and internal components, which are a main portion of the smart phone exists.

When separately installing the cover case and a reinforced structure at the inside of the smart phone for damage of internal components by the transferred impact, such a structure increases thickness and volume of the mobile terminal and becomes a limitation in a trend of a small size and a light weight of the mobile terminal.

SUMMARY

To address the above-discussed deficiencies, embodiments of the present disclosure provide a protective device for a mobile terminal that can protect the mobile terminal by preventing an external case and components mounted inside and on the outside of the mobile terminal from being damaged or broken.

Certain embodiments of the present disclosure include a protective device for a mobile terminal that corresponds to a trend of a small size and a light weight of the mobile terminal.

Certain embodiments of the present disclosure include a protective device for a mobile terminal that can provide solidity and an enhanced external appearance to the mobile terminal.

Certain embodiments of the present disclosure include a protective device for a mobile terminal including a glass window and a glass case housed in the mobile terminal and formed with glass of a three-dimensional curved surface form having a circumferential edge lower than the center. The protective device includes: a first peripheral protection portion housed along a circumferential edge of the glass window and in which a tangent line in which a portion thereof contacts with a surface of the glass window forms an angle of 0° or more with a horizontal line; and a second peripheral protection portion housed along a circumferential edge of the glass case and in which a tangent line in which a portion thereof contacts with a surface of the glass case forms an angle of 0° or more with a horizontal line.

Certain embodiments of the present disclosure include a mobile terminal that includes: a glass window housed at one surface of the mobile terminal and formed with glass of a three-dimensional curved surface having a circumferential edge lower than the center; a glass case housed at the other surface of the mobile terminal and formed with glass of a three-dimensional curved surface having a circumferential edge lower than the center; and a peripheral protection portion enclosing a circumferential edge of the glass window and/or the glass case and in which a portion facing a corner portion of the mobile terminal is protruded further than a curved portion of the glass window and/or the glass case to absorb an impact from the outside.

Certain embodiments of the present disclosure include a protective device for a mobile terminal including a glass window and a glass case housed in the mobile terminal and having glass of a three-dimensional curved surface form having a circumferential edge lower than the center. The protective device includes: a first protection portion enclosing a circumferential edge of the glass window and/or the glass case and in which a portion facing a corner portion of the mobile terminal is protruded further than a curved point of the glass window and/or the glass case; and a second protection portion housed at an upper surface of the glass window and/or the glass case and protruded further than the upper surface to absorb an impact from the outside.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

In the present disclosure, a mobile terminal includes a touch screen and is a portable electronic device such as a mobile phone, smart phone, tablet PC, and laptop PC. In the present disclosure, an accessory indicates an accessory of the mobile terminal that can be separated from the mobile terminal, which can include, for example a stylus pen, headphone, and keypad for touching a touch screen.

In embodiments of the present disclosure, the mobile terminal can be embodied as information and communication devices and multimedia devices such as a tablet personal computer (PC), mobile communication terminal, mobile phone, personal digital assistant (PDA), smart phone, international mobile telecommunication 2000 (IMT-2000) terminal, code division multiple access (CDMA) terminal, wideband code division multiple access (WCDMA) terminal, global system for mobile communication (GSM) terminal, general packet radio service (GPRS) terminal, enhanced data GSM environment (EDGE) terminal, universal mobile telecommunication service (UMTS) terminal, digital broadcasting terminal, and automated teller machine (ATM), and applications thereof.

Hereinafter, a first peripheral protection portion housed in a glass case of a mobile terminal according to embodiments of the present disclosure is described in detail with reference to FIGS. 2 through 4.

Figure 1A:
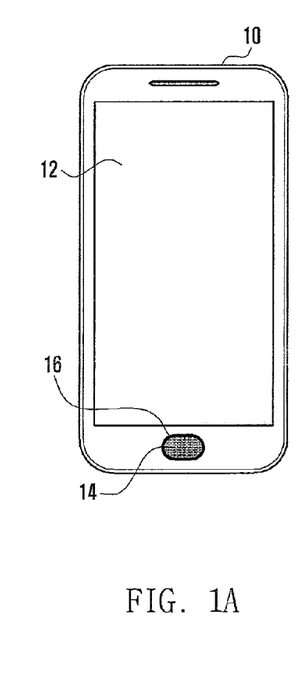
FIG. 1A illustrates a front surface of a general mobile terminal.
Figure 1B:
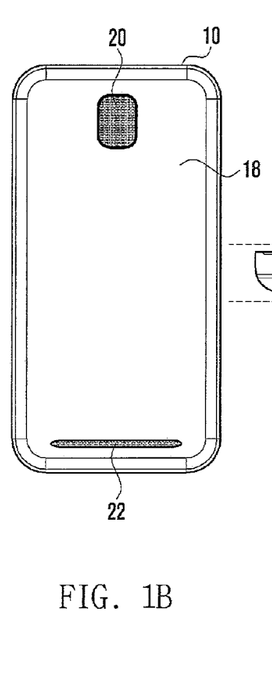
FIG. 1B illustrates a rear surface of the general mobile terminal of FIG. 1A.
Figure 1C:
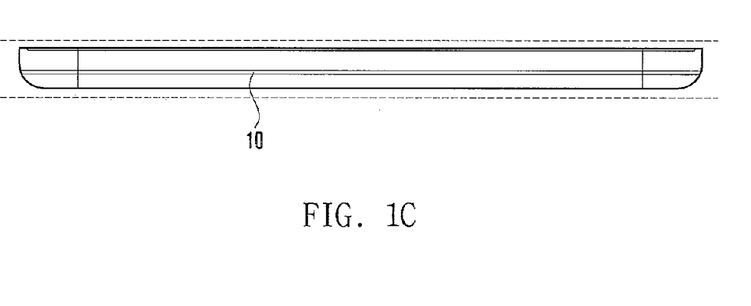
FIG. 1C illustrates a side surface of the general mobile terminal of FIG. 1A.

A mobile terminal 10 of FIGS. 1A-1C is a smart phone and is a mobile communication terminal that is integrated with a mobile phone function that can communicate with a general phone or a mobile communication terminal through a base station while moving and with a computer support function that can install and use an application in which a user wants by accessing to wireless Internet.

In order to effectively use the computer support function, an almost entire front surface of the mobile terminal 10 is formed with liquid crystal 12, and such liquid crystal 12 should increase strength to protect from damage by an external impact.

That is, in a smart phone, because the liquid crystal 12 for displaying a computer support function is an important element for embodying a function of a smart phone, unlike other mobile phones, it is important to endure an external impact while maintaining a clean state for a long term. Accordingly, the liquid crystal 12 of the smart phone is generally formed in a glass plate.

However, even if liquid crystal of a smart phone is formed in a glass plate, the smart phone does not have a separate device for protecting the inside and the outside of the smart phone.

Therefore, when a strong impact is applied to a front surface of an external appearance of the smart phone, due to a reason such as drop of the smart phone, does not have an external appearance design that can appropriately absorb and, distribute the impact and thus a problem that the applied impact is transferred to a cover case, and a display area and internal components, which are a main portion of the smart phone exists.

When separately installing the cover case and a reinforced structure at the inside of the smart phone for damage of internal components by the transferred impact, such a structure increases thickness and volume of the mobile terminal and becomes a limitation in a trend of a small size and a light weight of the mobile terminal.

Therefore, while corresponding to a trend of a small size and a light weight of the mobile terminal, development of a protective device for a mobile terminal and the mobile terminal having the same that can protect a cover case of the mobile terminal and components mounted inside and on the outside thereof from an external impact and that can provide solidity and an enhanced external appearance to the mobile terminal is needed in the art.

Figure 2:
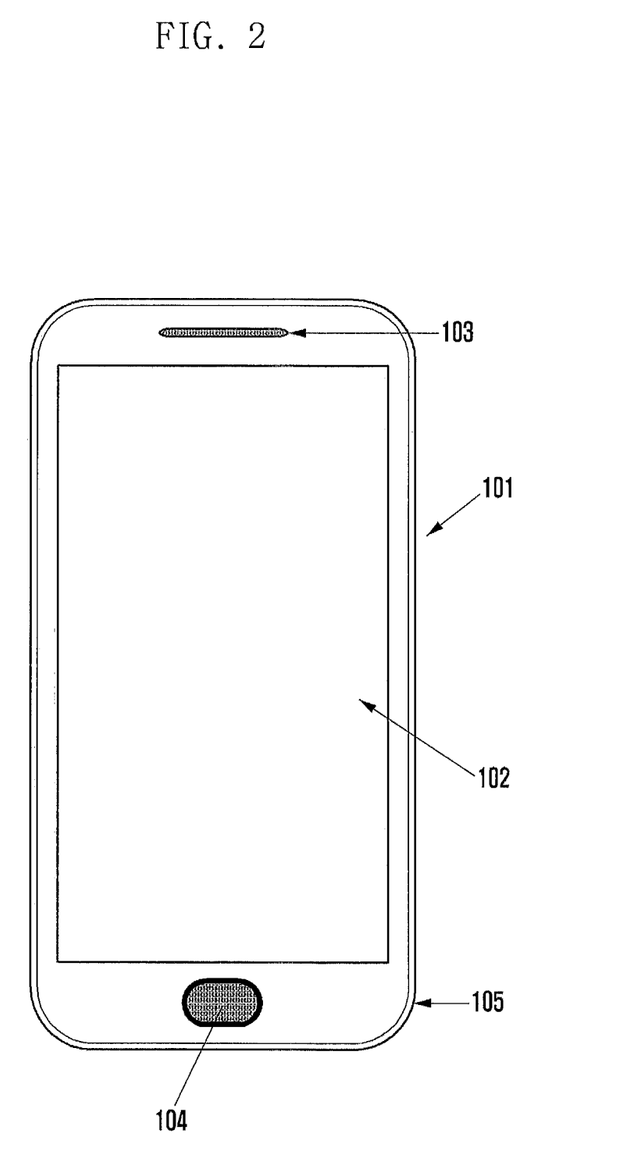
FIG. 2 illustrates a top plan view of a mobile terminal having a protective device for the mobile terminal according to embodiments of the present disclosure.
Figure 3:
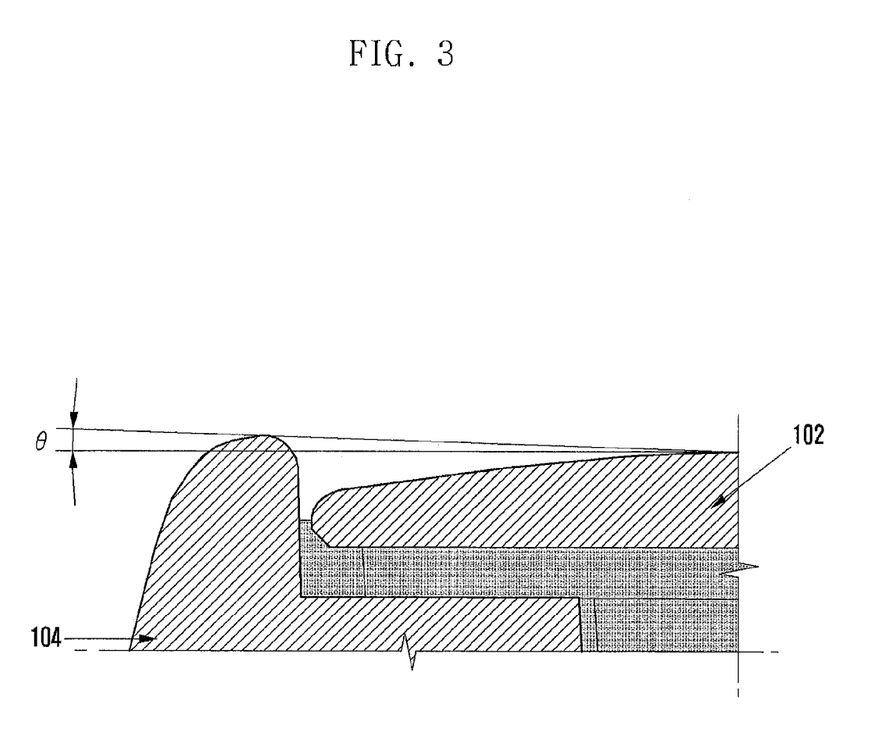
FIGS. 3 and 4 illustrate a cross-sectional views of a portion of a protective device for the mobile terminal of FIG. 2 according to embodiments of the present disclosure.
Figure 4:
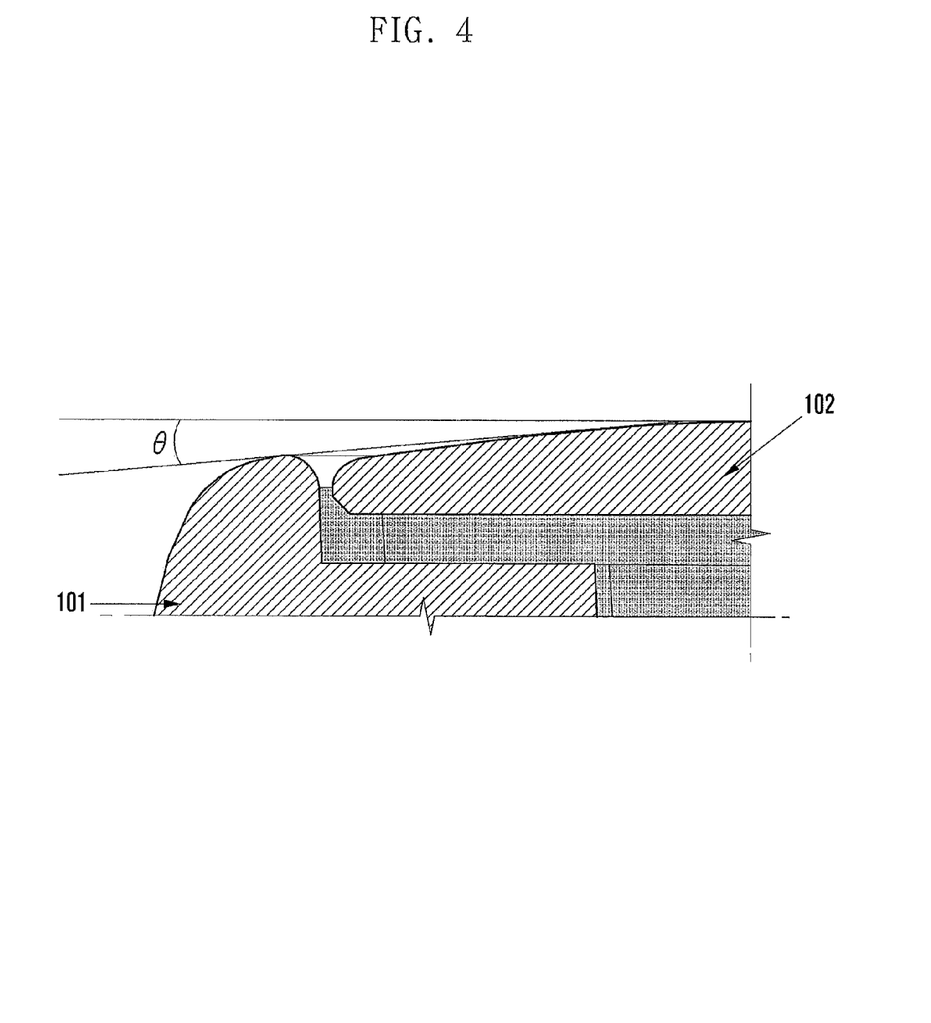

FIG. 2 illustrates a top plan view illustrating a mobile terminal having a protective device for the mobile terminal according to embodiments of the present disclosure, and FIGS. 3 and 4 illustrate respective side views of a portion of a protective device for the mobile terminal of FIG. 2.

Referring to FIG. 2, the mobile terminal according to embodiments of the present disclosure includes a glass window 102 housed in the remaining portions, except for a portion of the mobile terminal in which a glass case is housed. For example, the glass window 102 can be housed at a front surface of the mobile terminal. In a lower portion of the glass window 102, a display device and other input and output devices can be provided.

The glass window 102 includes glass of a three-dimensional curved surface form having a circumferential edge lower than the center.

The glass window 102 is coated with an inorganic material or a compound.

In certain embodiments, the glass window 102 may be formed with at least one of tempered glass, a polymer film and a plate material having an optical property, or a combination thereof. When the mobile terminal is dropped or collides with another object, in order to prevent the glass case 202 from being cracked and components provided inside of the mobile terminal from being damaged or broken by the impact, the polymer film is coated in pencil hardness H to B.

A portion of a first peripheral protection portion 101 facing a corner portion 105 of the mobile terminal is protruded further than a surface of the glass window 102. Hereinafter, the first peripheral protection portion 101 is described in detail with reference to the drawings.

The first peripheral protection portion 101 may be made of one of acrylonitrile butadiene styrene (ABS), polyamide (PA), polyacetal (POA), polycarbonate (PC), modified polyoxide (M-PRO), polybutylene terephthalate (PET), polyimide (PI), polyphenylene sulfide (PPS), polyamide imide (PAI), polyether imide (PEI), polyether ketone (PEK), liquid-crystal polyester (LCP), syndiotactic poly propylene (SPS), rubber, silicone, metal, and an inorganic material or a synthetic material thereof.

Referring to FIG. 3, the first peripheral protection portion 101 encloses a circumferential edge of the glass window 102, and the first peripheral protection portion 101 has a structure in which a tangent line on which a portion of the first peripheral protection portion 101 contacts with a surface of the glass window 102 forms an angle θ of 0° to 10° with a horizontal line.

That is, a tangent line simultaneously contacting with four corner portions 105 of the first peripheral protection portion 101 facing a curved point of the glass window 102 having a surface of a curved surface and the corner portion of the mobile terminal forms an angle θ of 0° to 10° with a horizontal line.

Referring to FIG. 4, a tangent line in which a portion of the first peripheral protection portion 101 contacts with a surface of the glass window 102 forms an angle θ of −10° to 0° with a horizontal line.

That is, a tangent line contacting with a portion 101 facing the side, except for a curved point of the glass window 102 having a surface of a curved surface and the corner portion 105 of the mobile terminal forms an angle θ of −10° to 0° with a horizontal line.

The first peripheral protection portion 101 has a thickness of 0.3 millimeters (mm) or more.

Further, the first peripheral protection portion 101 includes a structure in which the glass window 102 is extended along a side surface circumference of the mobile terminal.

In certain embodiments, when Young's Modulus of a main material of the glass window 102 is 80 gigapascals (Gpa), the first peripheral protection portion 101 is provided along a side surface of the mobile terminal.

As described above, in the first peripheral protection portion 101 according to embodiments of the present disclosure, as the corner portion 105 of the mobile terminal is protruded further than a surface of the glass window 102, when the mobile terminal drops or collides, the corner portion 105 absorbs an impact to prevent the glass window 102 and components mounted within the mobile terminal from being damaged and broken.

Hereinafter, a first protrusion protection portion provided in a glass window according to embodiments of the present disclosure is described in detail with reference to FIGS. 2, 5, and 6.

Figure 5:
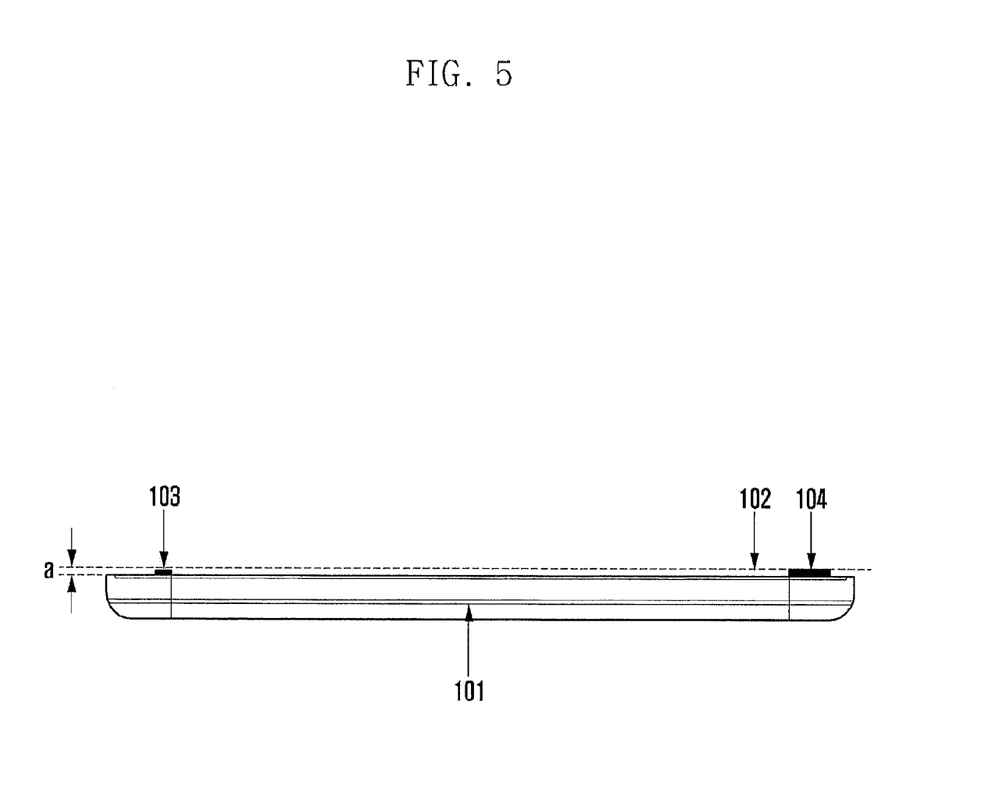
FIG. 5 illustrates a side view of a protective device for the mobile terminal of FIG. 2 according to embodiments of the present disclosure.
Figure 6:
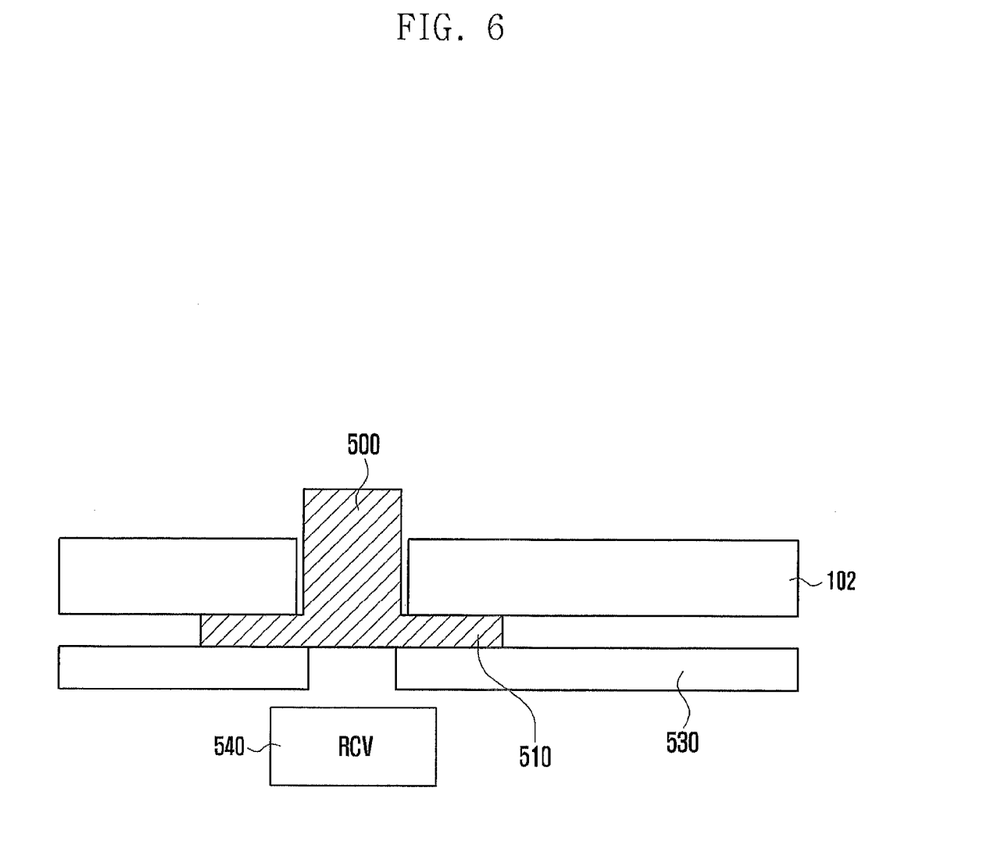
FIG. 6 illustrates a cross-sectional view of a protective device for the mobile terminal of FIG. 2 according to embodiments of the present disclosure.

FIG. 5 is a side view illustrating a protective device for the mobile terminal of FIG. 2, and FIG. 6 is a cross-sectional view illustrating a protective device for the mobile terminal of FIG. 2.

Referring to FIGS. 2, 5, and 6, the glass window 102 includes first protrusion protection portions 103 and 104 protruded by a predetermined height "a" above a surface of the glass window 102 to absorb an impact, when the mobile terminal drops or collides.

It is preferable that the first protrusion protection portions 103 and 104 are protruded further by 0.05 mm or more than a surface of the glass window 102. In certain embodiments, the first protrusion protection portions 103 and 104 can be protruded further by 0.3 mm or less than a surface of the glass case 202.

When the first protrusion protection portions 103 and 104 are protruded by 0.3 mm or more, the first protrusion protection portions 103 and 104 can be separated or damaged by friction with the outside and can disfigure an external appearance of the mobile terminal and thus a size of the first protrusion protection portions 103 and 104 performs an important function in embodying a performance as a protective device of the mobile terminal and providing an enhanced external appearance to the mobile terminal The first protrusion protection portions 103 and 104 can be provided in a pad form in which at least one of the first protrusion protection portions 103 and 104 is attached or fastened to a portion of the glass window 102.

In certain embodiments, the first protrusion protection portions 103 and 104 have a form in which a portion of a surface of the glass window 102 is protruded.

In certain embodiments, the first protrusion protection portions 103 and 104 are provided in at least one input and output device provided in a portion of the glass window 102. The input and output device can be provided in, for example an audio output device 103 or in an input device 104 such as a hard/soft key and a home key, and can be provided in other devices provided on the glass window 102.

Particularly, as described above, when the input and output device provided in an existing mobile terminal is used as the first protrusion protection portions 103 and 104, it is unnecessary to separately produce a device for protecting the mobile terminal and thus a process is simplified and a cost can be thus reduced.

Further, by using an existing device, it is unnecessary to additionally secure an area for installation and thus layout efficiency of the mobile terminal can be maximized. Further, a protecting function of the mobile terminal can be embodied and the mobile terminal can be provided in a small size and a light weight.

Alternatively, the first protrusion protection portions may be provided in an upper level of at least one of an electrical element including a receiver, speaker, camera, microphone, and various sensors of the mobile terminal exposed at a portion of a glass case, as shown in FIG. 6.

That is, referring to FIG. 6, the first protrusion protection portions are formed in a protruded portion 500 protruded by penetrating a portion of the glass window 102 and a fixing portion 510 fixed between a bracket 530 in which an edge extended from the bottom of the protruded portion 500 is provided inside of the mobile terminal and a lower surface of the glass window 102 facing the bracket 530.

FIG. 6 illustrates a first protrusion protection portion provided in an upper level of a receiver RCV 540, but a position of the first protrusion protection portion is not limited thereto and the first protrusion protection portion can be provided to another input and output device or internal components of the mobile terminal other than a receiver.

The fixing portion 510 of the first protrusion protection portion can be fixed by an adhesive, a tape, or a fastening structure to a lower surface of the glass window 102 facing thereto.

In certain embodiments, the first protrusion protection portions 103 and 104 are provided in at least one input and output device provided in a portion of the glass window 102. Here, the input and output device is provided in, for example an image input device 203 and can be any device provided on the glass window 102 other than the image input device 203.

The first protrusion protection portions 103 and 104 can be formed with an alloy having a thickness of 0.3 mm or less or an injection material, a rigid body, or a low compressible material having a thickness of 0.5 mm or more.

The low compressible material has hardness of shore A 75 or more based on a shore durometer.

The first protrusion protection portions 103 and 104 can be composed of one of acrylonitrile butadiene styrene (ABS), polyamide (PA), polyacetal (POA), polycarbonate (PC), modified polyoxide (M-PRO), polybutylene terephthalate (PBT), polyimide (PI), polyphenylene sulfide (PPS), polyamide imide (PAI), polyether imide (PEI), polyether ketone (PEK), liquid crystal polyester (LCP), syndiotactic poly propylene (SPS), rubber, silicone, metal, and an inorganic material or a synthetic material thereof.

As described above, a protective device for a mobile terminal according to embodiments of the present disclosure includes a first protrusion protection portion protruded in a predetermined height in a glass window of the mobile terminal. Thus, for example, when the mobile terminal drops or collides, the first protrusion protection portion first absorbs an impact to prevent a glass window from being cracked or to prevent internal components from being damaged and broken.

Hereinafter, a second protrusion protection portion housed in a glass case of a mobile terminal according to embodiments of the present disclosure is described in detail with reference to FIGS. 7 to 9.

Figure 7:
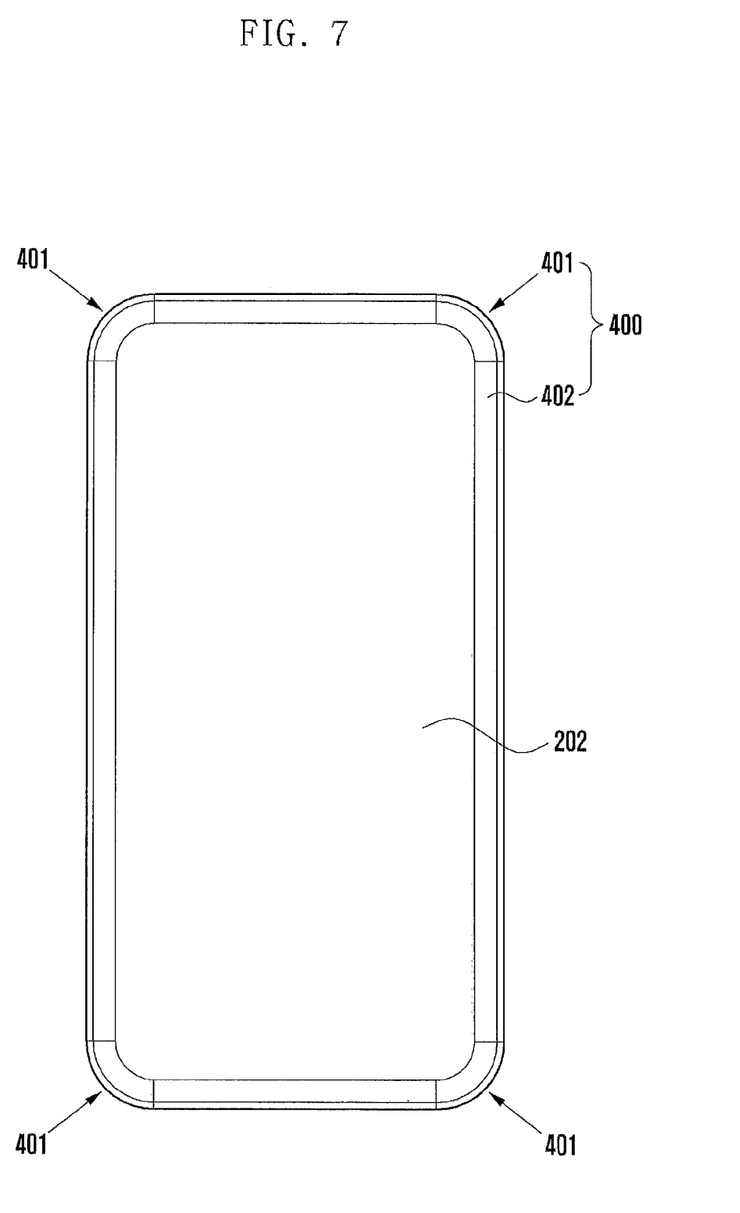
FIG. 7 illustrates a top plan view of a glass case of the mobile terminal of FIG. 2 according to embodiments of the present disclosure.

FIG. 7 illustrates a top plan view illustrating a glass case of the mobile terminal of FIG. 2. FIGS. 8 and 9 are side views of the glass case of the mobile terminal of FIG. 7.

Referring to FIG. 7, the mobile terminal having a protective device for the mobile terminal according to embodiments of the present disclosure includes a glass case 202 housed in a portion of the mobile terminal and a second peripheral protection portion 400.

The glass case 202 is housed in a portion, except for a front surface having a window of the mobile terminal. In certain embodiments, the glass case 202 is housed at the remaining surfaces, except for the front surface to protect components housed at the inside of the mobile terminal.

The glass case 202 includes glass of a plane form or glass of a three-dimensional curved surface form having a circumferential edge lower than the center.

The glass case 202 is coated with an inorganic material or a compound.

The glass case 202 is formed with at least one of tempered glass, a polymer film and a plate material having an optical property, or a combination thereof. In certain embodiments, when the mobile terminal drops or collides with another object, in order to prevent the glass case 202 from being cracked and components provided inside of the mobile terminal from being damaged or broken by the impact, the polymer film may be coated to pencil hardness H to B.

A portion of the second peripheral protection portion 400 facing a corner portion 401 of the mobile terminal has a structure protruded further than a surface of the glass case 202. Hereinafter, the second peripheral protection portion 400 is described in detail with reference to the drawings.

The second peripheral protection portion 400 can be made of one of acrylonitrile butadiene styrene (ABS), polyamide (PA), polyacetal (POA), polycarbonate (PC), modified polyoxide (M-PRO), polybutylene terephthalate (PBT), polyimide (PI), polyphenylene sulfide (PPS), polyamide imide (PAI), polyether imide (PEI), polyether ketone (PEK), liquid crystal polyester (LCP), syndiotactic poly propylene (SPS), rubber, silicone, metal, and an inorganic material or a synthetic material thereof.

Figure 8:
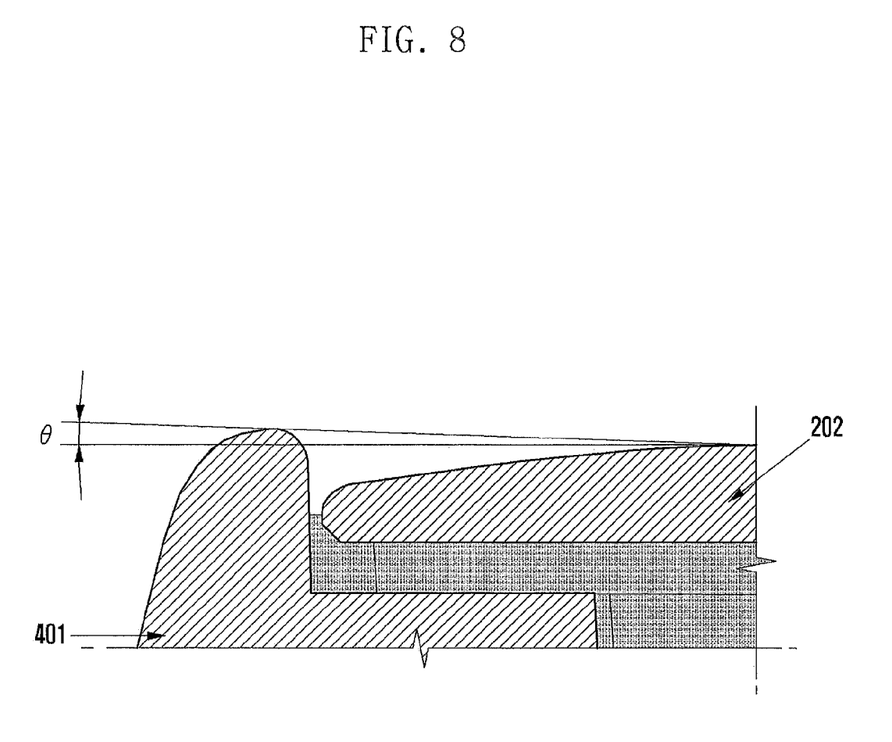
FIGS. 8 and 9 illustrate a cross-sectional views of the glass case of the mobile terminal of FIG. 7.

Referring to FIG. 8, the peripheral protection portion 400 encloses a circumferential edge of the glass case 202, and the peripheral protection portion 400 has a structure in which a tangent line on which a portion of the peripheral protection portion 400 contacts with a surface of the glass case 202 forms an angle θ of 0° to 10° with a horizontal line.

That is, a tangent line simultaneously contacting with four corner portions 401 of the second peripheral protection portion 400 facing a curved point of the glass case 202 having a surface of a curved surface and the corner portion 401 of the mobile terminal forms an angle θ of 0° to 10° with a horizontal line.

Figure 9:
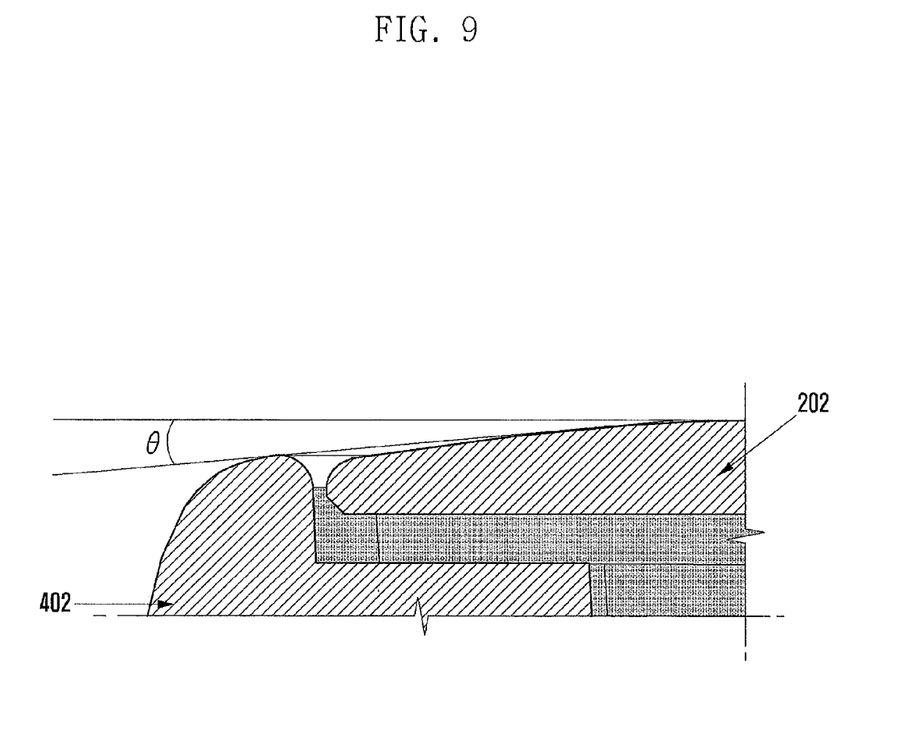

Referring to FIG. 9, a tangent line in which a portion of the second peripheral protection portion 402 contacts with a surface of the glass case 202 forms an angle θ of −10° to 0° with a horizontal line.

That is, a tangent line contacting with a portion 402 facing the side, except for a curved point of the glass case 202 having a surface of a curved surface and a corner portion of the mobile terminal forms an angle θ of −10° to 0° with a horizontal line.

The second peripheral protection portion 400 has a thickness of 0.3 mm or more.

Further, the second peripheral protection portion 400 may have a structure in which the glass case 202 is extended along a side surface circumference of the mobile terminal.

When Young's Modulus of a main material of the glass case 202 is 80 Gpa, the second peripheral protection portion 400 can further be provided along a side surface of the mobile terminal.

As described above, in the second peripheral protection portion 400 according to embodiments of the present disclosure, as the corner portion 401 of the mobile terminal is protruded further than a surface of the glass case 202, when the mobile terminal drops or collides, the corner portion 401 absorbs an impact to prevent the glass case 202 and components mounted within the mobile terminal from being damaged and broken.

Hereinafter, a second protrusion protection portion provided in a glass case according to embodiments of the present disclosure is described in detail with reference to FIGS. 10 and 11.

Figure 10:
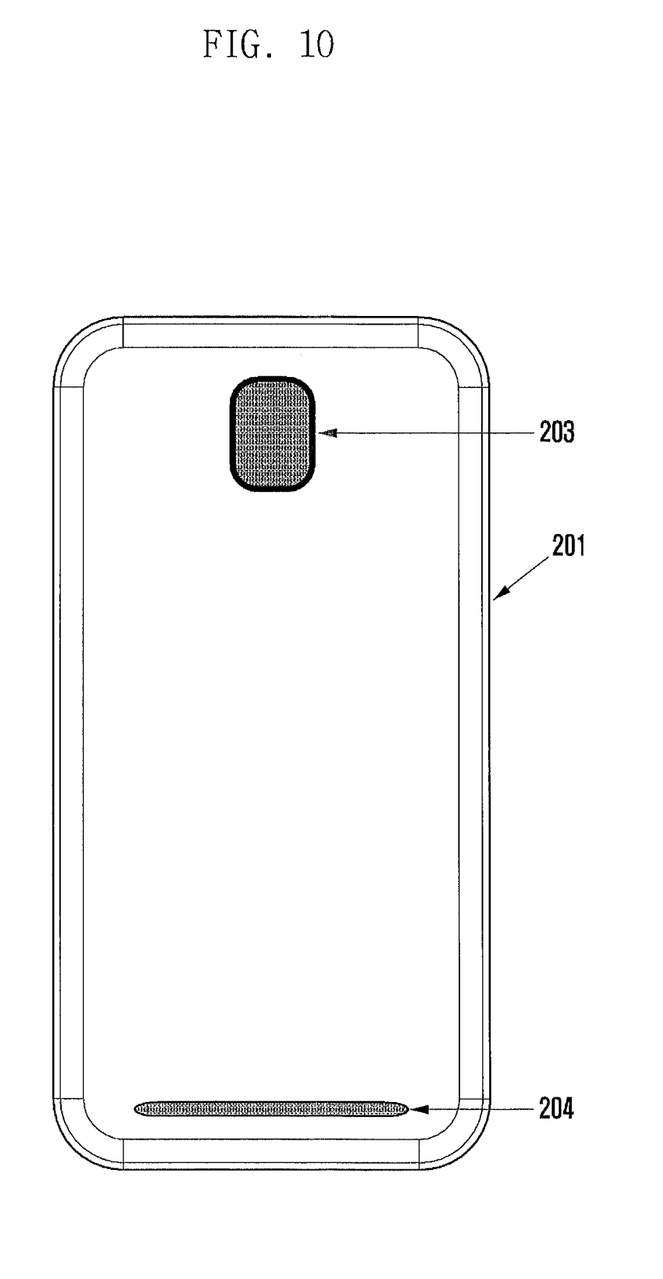
FIG. 10 illustrates a rear view of a second protrusion protection portion provided in the glass case of the mobile terminal of FIG. 7.
Figure 11:
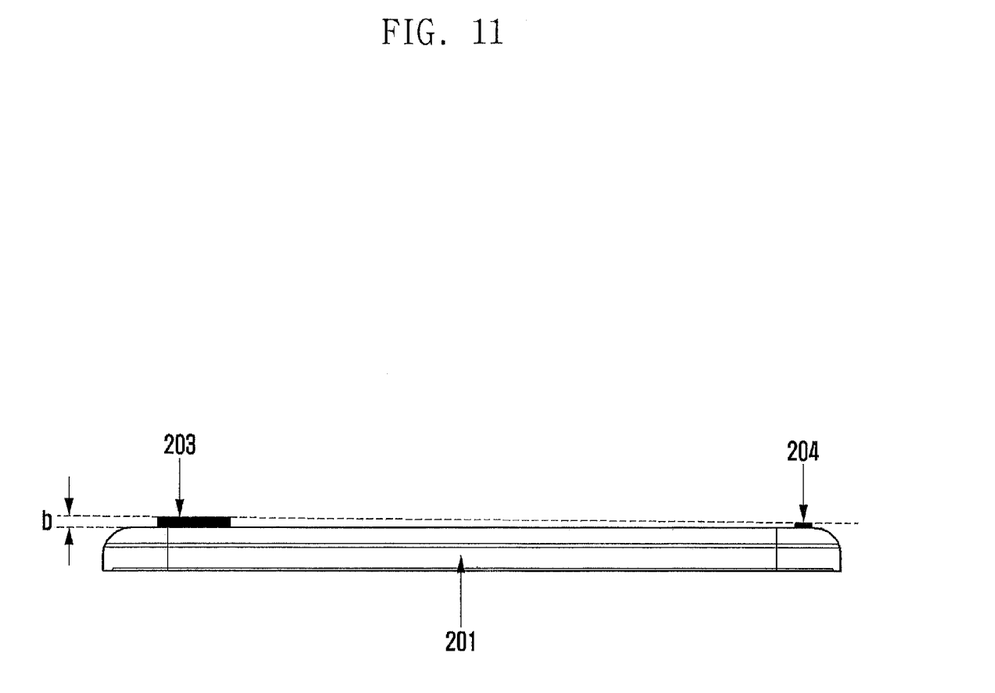
FIG. 11 illustrates a side view of a second protrusion protection portion provided in the glass case of the mobile terminal of FIG. 7.

FIG. 10 is a rear view illustrating a second protrusion protection portion provided in the glass case of the mobile terminal of FIG. 7, and FIG. 11 is a side view illustrating a second protrusion protection portion provided in the glass case of the mobile terminal of FIG. 7.

The glass case 202 described above and a glass case 202 have the same function and structure and therefore a detailed description of the glass case 202 is omitted.

Referring to FIGS. 10 and 11, the glass case 202 according to embodiments of the present disclosure further includes second protrusion protection portions 203 and 204 having a portion protruded further by a predetermined height than a surface of the glass case 202 to absorb an impact, when the mobile terminal drops or collides.

The second protrusion protection portions 203 and 204 are protruded further by 0.05 mm "b" or more than a surface of the glass case 202, as shown in FIG. 11. In certain embodiments, the second protrusion protection portions 203 and 204 can protrude further by 0.05 mm to 0.3 mm than then surface of the glass case 202.

When the second protrusion protection portions 203 and 204 are protruded by 0.3 mm or more, the second protrusion protection portions 203 and 204 may be separated or damaged by friction with the outside and may disfigure an external appearance of the mobile terminal and thus a size of the second protrusion protection portions 203 and 204 performs an important function in embodying a performance as a protective device of the mobile terminal and providing an enhanced external appearance to the mobile terminal.

In certain embodiments, the second protrusion protection portions 203 and 204 include a pad form in which at least one of the second protrusion protection portions 203 and 204 is attached or fastened to a portion of the glass case 202.

In certain embodiments, the second protrusion protection portions 203 and 204 include a form in which a portion of a surface of the glass case 202 is protruded.

In certain embodiments, the second protrusion protection portions 203 and 204 have a structure provided, in an upper level of at least one of electrical elements including a receiver, speaker, camera, microphone, and various sensors of the mobile terminal exposed at a portion of the glass case 202, as shown in FIG. 7.

is, the second protrusion protection portions 203 and 204 includes a structure provided in an upper level of at least one of electrical elements including a receiver, speaker, camera, microphone, and various sensors of the mobile terminal exposed at a portion of the glass case 202, similar to a structure of the first protrusion protection portion shown in FIG. 6.

The second protrusion protection portions 203 and 204 are formed with an alloy having a thickness of 0.3 mm or less or an injection material, a rigid body, or a low compressible material having a thickness of 0.5 mm or more.

The low compressible material has hardness of shore A 75 or more based on a shore durometer.

The second protrusion protection portions 203 and 204 can be made of one of acrylonitrile butadiene styrene (ABS), polyamide (PA), polyacetal (POA), polycarbonate (PC), modified polyoxide (M-PRO), polybutylene terephthalate (PBT) polyimide (PI), polyphenylene sulfide (PPS), polyamide imide (PAI), polyether imide (PEI), polyether ketone (PEK), liquid crystal polyester (LCP), syndiotactic poly propylene (SPS), rubber, silicone, metal, and an inorganic material or a synthetic material thereof.

As described above, a protective device for a mobile terminal according to embodiments of the present disclosure includes a second protrusion protection portion protruded by a predetermined height in a glass case of the mobile terminal. Thus, for example, when the mobile terminal drops or collides with an object, the second protrusion protection portion absorbs the impact first to prevent a glass window from being cracked and to prevent internal components from being damaged or broken.

As described above, when a mobile terminal drops or collides, by absorbing an impact, a protective device for the mobile terminal according to the present disclosure protects the mobile terminal by preventing components, a window, and a case mounted inside and on the outside of the mobile terminal from being damaged or broken.

Further, the protective device corresponds to a trend of a small size and a light weight of the mobile terminal and provides solidity and an enhanced external appearance to the mobile terminal.

Although the present disclosure has been described with an example, various changes and modifications may be suggested to one skilled in the art. It is intended that the present disclosure encompass such changes and modifications as fall within the scope of the appended claims.

What is claimed is:

1. A protective device for a mobile terminal comprising a glass window and a glass case housed in the mobile terminal and formed with glass of a three-dimensional curved surface form having a circumferential edge lower than the center, the protective device comprising:
   a first peripheral protection portion housed along a circumferential edge of the glass window and in which a tangent line in which a portion thereof contacts with a surface of the glass window forms an angle of at least 0° with a horizontal line; and
   a second peripheral protection portion housed along a circumferential edge of the glass case and in which a tangent line in which a portion thereof contacts with a surface of the glass case forms an angle of at least 0° with a horizontal line.

2. The protective device of claim 1, wherein a portion of the first peripheral protection portion facing a corner portion of the mobile terminal is protruded further than a surface of the glass window.

3. The protective device of claim 1, wherein an angle in which a tangent line in contact with a portion of the first peripheral protection portion facing a curved point of the glass window and a corner portion of the mobile terminal forms with a horizontal line is in a range of 0° to 10°.

4. The protective device of claim 1, wherein an angle in which a tangent line in contact with a portion of the first peripheral protection portion facing the side, except for a curved point of the glass window and a corner portion of the mobile terminal forms with a horizontal line is in a range of −10° to 0°.

5. The protective device of claim 1, wherein a portion of the second peripheral protection portion facing a corner portion of the mobile terminal is protruded further than a surface of the glass case.

6. The protective device of claim 1, wherein an angle in which a tangent line in contact with a portion of the second peripheral protection portion facing a curved point of the glass case and a corner portion of the mobile terminal forms with a horizontal line is in a range of 0° to 10°.

7. The protective device of claim 1, wherein an angle in which a tangent line in contact with a portion of the second peripheral protection portion facing the side, except for a curved point of the glass case and a corner portion of the mobile terminal forms with a horizontal line is in a range of −10° to 0°.

8. The protective device of claim 1, wherein the first and second peripheral protection portions have a thickness of at least 0.3 millimeters (mm).

9. The protective device of claim 1, wherein the first and second peripheral protection portions are composed of one of an inorganic material and a synthetic material of one of: acrylonitrile butadiene styrene (ABS), polyamide (PA), polyacetal (POA), polycarbonate (PC), modified polyoxide (M-PRO), polybutylene terephthalate (PBT), polyimide (PI), polyphenylene sulfide (PPS), polyamide imide (PAT), polyether imide (PEI), polyether ketone (PEK), liquidcrystal polyester (LCP), syndiotactic poly propylene (SPS), rubber, silicone, and metal.

10. The protective device of claim 1, wherein the first or second peripheral protection portion is further provided along a side surface circumference of the mobile terminal, when Young's modulus of a main material of the glass window or the glass case is 80 gigapascals (Gpa).

11. The protective device of claim 1, wherein the glass window comprises a first protrusion protection portion housed in a portion of the glass window and protruded further by a predetermined height than a surface of the glass window to absorb an impact, when the mobile terminal collides with an object.

12. The protective device of claim 11, wherein the first protrusion protection portion is protruded further by 0.05 millimeters (mm) or more than a surface of the glass window.

13. The protective device of claim 11, wherein the first protrusion protection portion includes a pad form on which at least one of the first protrusion protection portion is attached to a portion of the glass window and the first protrusion protection portion is fastened to the portion of the glass window.

14. The protective device of claim 11, wherein in the first protrusion protection portion includes a form in which a portion of a surface of the glass window is protruded.

15. The protective device of claim 11, wherein the first protrusion protection portion is at least one of an input device and an output device in a portion of the glass window.

16. The protective device of claim 11, wherein the first protrusion protection portion is provided in an upper level of at least one of a camera, a microphone, various sensors, and a receiver of the mobile terminal exposed at a portion of the glass window.

17. The protective device of claim 11, wherein the first protrusion protection portion comprises:
  a protruded portion protruded and configured to penetrate a portion of the glass window; and
  a fixing portion with an edge extended from the bottom of the protruded portion, wherein the fixing portion is fixed between a bracket inside of the mobile terminal and a lower surface of the glass window facing the bracket.

18. The protective device of claim 17, wherein the fixing portion of the first protrusion protection portion is fixed to a lower surface of the glass window facing the fixing portion by an adhesive, a tape or a fastening structure.

19. The protective device of claim 11, wherein the first protrusion protection portion is composed of one of an injection material and an alloy having a thickness of at most 0.3 mm, a rigid body, or a low compressible material having a thickness of at least 0.5 mm.

20. The protective device of claim 19, wherein the low compressible material has hardness of shore A 75 or more based on a shore durometer.

21. The protective device of claim 11, wherein the first protrusion protection portion is composed of one of an inorganic material and a synthetic material of one of: acrylonitrile butadiene styrene (ABS), polyamide (PA), polyacetal (POA), polycarbonate (PC), modified polyoxide (M-PRO), polybutylene terephthalate (PBT), polyimide (PI), polyphenylene sulfide (PPS), polyamide imide (PAI), polyether imide (PEI), polyether ketone (PEK), liquidcrystal polyester (LCP), syndiotactic poly propylene (SPS), rubber, silicone, and metal.

22. The protective device of claim 1, further comprising a second protrusion protection portion housed in a portion of the glass case and protruded further than a surface of the glass case by a predetermined height and configured to absorb an impact when the mobile terminal collides with an object.

23. The protective device of claim 22, wherein the second protrusion protection portion is protruded further than the surface of the glass case by at least 0.05 mm.

24. The protective device of claim 22, wherein the second protrusion protection portion includes a pad form in which the second protrusion protection portion is at least one of attached to and fastened to a portion of the glass case.

25. The protective device of claim 22, wherein the second protrusion protection portion has a form in which a portion of a surface of the glass case is protruded.

26. The protective device of claim 22, wherein the second protrusion protection portion is at least one of an input device and an output device in a portion of the glass case.

27. The protective device of claim 22, wherein the second protrusion protection portion is provided in an upper level of at least one of: a receiver, a speaker, a camera, a microphone, and various sensors of the mobile terminal exposed at a portion of the glass case.

28. The protective device of claim 22, wherein the second protrusion protection portion comprises:
  a protruded portion protruded and configured to penetrate a portion of the glass case; and
  a fixing portion including an edge extended from the bottom of the protruded portion, wherein the fixing portion is fixed between a bracket inside of the mobile terminal and a lower surface of the glass case facing the bracket.

29. The protective device of claim 28, wherein the fixing portion of the second protrusion protection portion is fixed to a lower surface of the glass case facing the fixing portion by one of: an adhesive, a tape, and a fastening structure.

30. The protective device of claim 22, wherein the second protrusion protection portion is composed of at least one of:
one of an injection material and an alloy having a thickness of at most 0.3 mm,
a rigid body, and
a low compressible material having a thickness of at least 0.5 mm.

31. The protective device of claim 30, wherein the low compressible material has hardness of shore A 75 or more based on a shore durometer.

32. The protective device of claim 22, wherein the second protrusion protection portion is composed of one of an inorganic material and a synthetic material of one of: acrylonitrile butadiene styrene (ABS), polyamide (PA), polyacetal (POA), polycarbonate (PC), modified polyoxide (M-PRO), polybutylene terephthalate (PBT), polyimide (PI), polyphenylene sulfide (PPS), polyamide imide (PAI), polyether imide (PEI), polyether ketone (PEK), liquidcrystal polyester (LCP), syndiotactic poly propylene (SPS), rubber, silicone, and metal.

33. The protective device of claim 1, wherein the glass window comprises a display device and another at least one of an input device and an output devices in a lower portion.

34. The protective device of claim 1, wherein the glass window is coated with one of: an inorganic material and an inorganic compound.

35. The protective device of claim 1, wherein the glass window is formed of at least one of: tempered glass, a polymer film, a plate material having an optical property, and a combination thereof.

36. The protective device of claim 1, wherein the polymer film of the glass window is coated to pencil hardness H to B to prevent a crack of the glass window by an impact when the mobile terminal collides with an object.

37. The protective device of claim 1, wherein the glass case is formed from at least one of tempered glass, a polymer film, a plate material having an optical property, and a combination thereof.

38. The protective device of claim 1, wherein the polymer film of the glass case is coated to pencil hardness H to B to prevent a crack of the glass case by an impact when the mobile terminal collides with an object.

39. The protective device of claim 1, wherein the glass case is coated with one of: an inorganic material and an inorganic compound.

40. The protective device of claim 1, wherein the glass case is housed at remaining surfaces, except for a front surface of the mobile terminal that is the glass window to protect an internal element of the mobile terminal.

41. The protective device of claim 1, wherein the glass case is formed as one of: a three-dimensional curved surface form and a plane in which a circumferential edge is lower than a center.

42. A mobile terminal, comprising:
a glass window housed at one surface of the mobile terminal and found with glass of a three-dimensional curved surface having a circumferential edge lower than a center;
a glass case housed at another surface of the mobile terminal and formed with glass of a three-dimensional curved surface having a circumferential edge lower than the center; and
a peripheral protection portion enclosing a circumferential edge of at least one of the glass window or the glass case, and wherein the peripheral protection portion includes a portion that faces a corner portion of the mobile terminal and is protruded further than a curved portion of the glass window and the glass case to absorb an impact from outside.

43. The mobile terminal of claim 42, wherein a height of a portion of the peripheral protection portion facing four corner portions of the mobile terminal is a maximum of 0.3 millimeters from the surface of the glass case.

44. A protective device for a mobile terminal that comprises a glass window and a glass case housed in the mobile terminal and having glass of a three-dimensional curved surface from having a circumferential edge lower than a center, the protective device comprising:
a first protection portion configured to enclose a circumferential edge of the glass window and the glass case and in which a portion facing a corner portion of the mobile terminal is protruded further than a curved point of the glass window and the glass case; and
a second protection portion configured to attach to an upper surface of the glass window and the glass case and protruded further than the upper surface to absorb an impact from the outside.

* * * * *